US 7,864,157 B1

(12) United States Patent
Wright

(10) Patent No.: US 7,864,157 B1
(45) Date of Patent: Jan. 4, 2011

(54) METHOD AND APPARATUS FOR SENSING MOVEMENT OF A HUMAN INTERFACE DEVICE

(75) Inventor: David G. Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 827 days.

(21) Appl. No.: 10/875,561

(22) Filed: Jun. 23, 2004

Related U.S. Application Data

(60) Provisional application No. 60/483,092, filed on Jun. 27, 2003.

(51) Int. Cl.
G06F 3/033 (2006.01)
G09G 5/00 (2006.01)
(52) U.S. Cl. ...................................... 345/158; 345/163
(58) Field of Classification Search .......... 345/156–184
See application file for complete search history.

(56) References Cited

U.S. PATENT DOCUMENTS 4,054,881 A * 10/1977 Raab ........................... 342/448
4,754,268 A * 6/1988 Mori ........................... 345/163
4,945,305 A * 7/1990 Blood .................... 324/207.17
4,988,981 A * 1/1991 Zimmerman et al. ........ 345/158
5,059,959 A * 10/1991 Barry ......................... 345/168
5,264,856 A * 11/1993 Thurlow ..................... 342/188
5,565,887 A * 10/1996 McCambridge et al. ..... 715/856
5,923,757 A * 7/1999 Hocker et al. .............. 345/156
7,325,723 B2 * 2/2008 Desjeux ...................... 235/380
2002/0057254 A1* 5/2002 Kurashima et al. .......... 345/156
2003/0060218 A1* 3/2003 Billerbeck et al. .......... 455/501
2003/0080944 A1* 5/2003 Takahashi et al. ........... 345/168
2004/0113890 A1* 6/2004 Ranta ......................... 345/166
2004/0169638 A1* 9/2004 Kaplan ....................... 345/156

FOREIGN PATENT DOCUMENTS

WO WO03/003290 * 1/2003

* cited by examiner

*Primary Examiner*—Chanh Nguyen
*Assistant Examiner*—Calvin C Ma

(57) ABSTRACT

Electromagnetic signals are sent between a base station and a human interface device (HID). Movements of the HID are detected according to an amount of time required for the electromagnetic signals to return back from the HID. In one embodiment, the electromagnetic signals are radio frequency (RF) waves carrying one or more pulses that are sent by multiple antennas in the base station and returned back from multiple antennas in the HID.

20 Claims, 8 Drawing Sheets

METHOD AND APPARATUS FOR SENSING MOVEMENT OF A HUMAN INTERFACE DEVICE

RELATED APPLICATION

This application claims the priority of U.S. Provisional Application Ser. No. 60/483,092, filed Jun. 27, 2003.

TECHNICAL FIELD

The present invention relates generally to human interface devices and in particular to pointing devices.

BACKGROUND OF THE INVENTION

Conventional pointing devices, such as computer mice, sense motion by using opto-mechanical sensing of the motion of a ball in contact with a surface over which the mouse is being moved. The ball is situated in a cavity, and is free to rotate as the mouse is moved. The ball is also in contact with a pair of orthogonally positioned rollers, which are coupled with slotted disks. Rotation of the disks is detected optically by a Light Emitting Diode (LED) and a pair of photo detectors.

One drawback to this roller ball design is the tendency for the rollers to collect dust and dirt. This results in slippage between the ball and rollers causing unreliable motion detection. For this reason, in recent years mice have moved to direct optical sensing where the motion of the mouse is sensed relative to the surface over which it is being moved. Typically, an optical mouse has an optical sensor, similar to a low resolution camera that views the surface where the mouse is being moved. The surface is illuminated by an LED. The sensor takes pictures of the surface, detecting microscopic variations in even an apparently smooth surface. Successive frames of the surface image are compared, and motion inferred from the changes in surface features between images.

Recently, there has also been a growing market for wireless mice. Users are inconvenienced by the wire that traditionally connects the mouse to a Personal Computer (PC), and the limited freedom of movement caused by the wire. The battery life of wireless optical mice typically varies between a few weeks and a couple of months. The wireless mouse battery life is acceptable for many home users, but has resulted in limited adoption in office environments. This is partially due to Information Technology (IT) managers not wanting to continuously change mouse batteries. The greatest power drain in optical mice is generally the optical subsystem that includes both the power drawn by the LED that illuminates the mouse contact surface and the current consumption of the optical sensor.

In wired or wireless mice, the optical sensors and associated components significantly increase the cost over mice that use roller balls. In summary, wireless mice have short battery life due to the current consumption of the optical sensor and subsystem and are relatively expensive due to the cost of both the optical and wireless subsystems.

SUMMARY OF THE INVENTION

Electromagnetic signals are sent between a base station and a human interface device (HID). Movements of the HID are detected according to an amount of time required for the electromagnetic signals to return back from the HID. In one embodiment, the electromagnetic signals are radio frequency (RF) waves carrying one or more pulses that are sent by multiple antennas in the base station and returned back from multiple antennas in the HID.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 shows how an output signal is generated from the communications shown in

FIG. 2.

DETAILED DESCRIPTION

Figure 1:
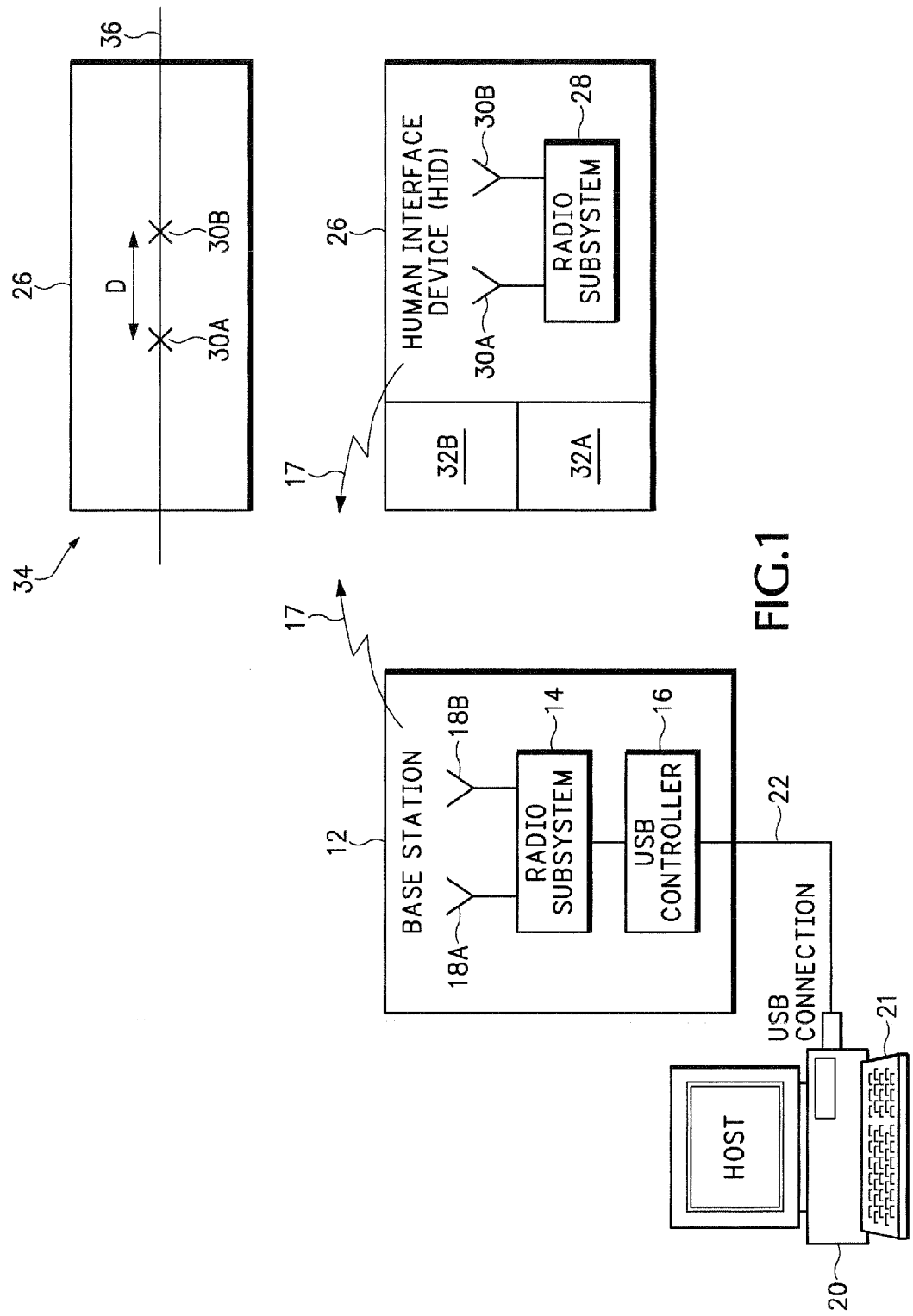
FIG. 1 is a first embodiment of a radio based wireless pointing device.

FIG. 1 shows how movement of a Human Interface Device (HID) 26 is sensed using electromagnetic signals 17. Movements of the HID 26 are detected according to an amount of time required for the electromagnetic signals 17 to return back from the HID 26 to a base station 12. In one embodiment, the electromagnetic signals 17 are radio frequency (RF) waves carrying one or more pulses that are sent by multiple antennas 18A and 18B in the base station 12 and returned back from multiple antennas 30A and 30B in the HID 26.

In one example, the HID 26 is a pointing device that includes a radio subsystem 28 and selection buttons 32A and 32B. In one embodiment, the pointing device 26 is a computer mouse. However, the HID 26 can be any other type of wireless peripheral device that requires position information to be wirelessly communicated to a host computer 20. For example, the HID 26 can be a game controller or any other type of remote control device where the motion of the device is detected using electromagnetic waves. However, for explanation purposes below, the HID 26 will be referred to as a pointing device.

The base station 12 includes a radio subsystem 14 that is connected to a host computer 20, such as a Personal Computer (PC). In one embodiment, the base station 12 includes a USB controller 16 that converts information from radio subsystem 14 into USB signals that are sent to a host computer 20 over USB connection 22. In other embodiments, the base station 12 does not have to be connected to the host 20 through a USB connection 22 and can alternately be connected to the host 20 through any type of conventional PC or mouse interface. In another embodiment, the base station 12 may be integrated into the host computer 20.

In this example, the radio subsystem 14 has two antennas 18A and 18B and the radio subsystem 28 has two antennas 30A and 30B. In a top view 34, the antennas 30A and 30B are spaced apart a known distance D and located along a center line 36 of the pointing device 26. It is not necessary that the antennas 18A and 18B in the base station 12 are located along any particular axis but it is preferable that they be reasonably well spaced apart.

Figure 2:
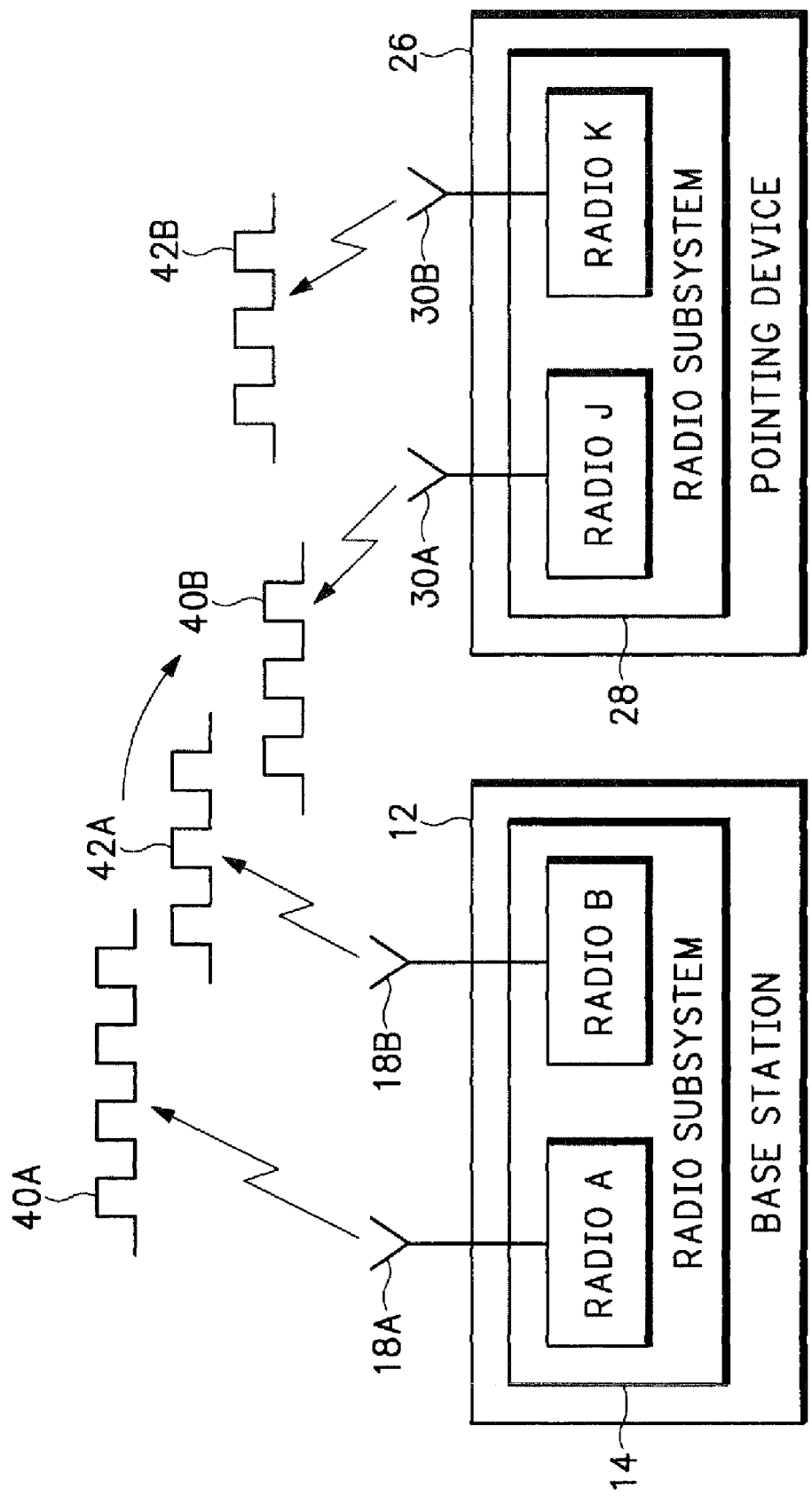
FIG. 2 is a diagram showing a 'ping-pong' communication between a base station and the wireless pointing device.

FIG. 2 shows the four antennas 18A, 18B, 30A and 30B all located in approximately the same plane of pointing device movement. A radio A in the radio subsystem 14 communicates with a radio J in the pointing device radio subsystem 28 through antennas 18A and 30A, respectively. A radio B in the radio subsystem 14 communicates with a radio K in the pointing device radio subsystem 28 using antennas 18B and 30B, respectively. The radio pairs AJ and BK may use different radio frequencies in order to prevent interference.

Radio A sends RF pulses or short bursts of pulses 40A on a particular Radio Frequency (RF) to radio J. When the pulse or burst of pulses 40A are received at the given RF frequency, radio J retransmits the pulse or burst of pulses 40B back to radio A. Radio A then retransmits the pulse or burst 40A back to radio J. Radios B and K conduct a similar ping-pong operation with radio B sending pulses or burst of pulses 42A to radio K at a second RF frequency and radio K then sends the pulses or burst of pulses 42B back to radio B. In one example, the RF frequency of signal 42A is half the RF frequency of radio B.

Figure 3:
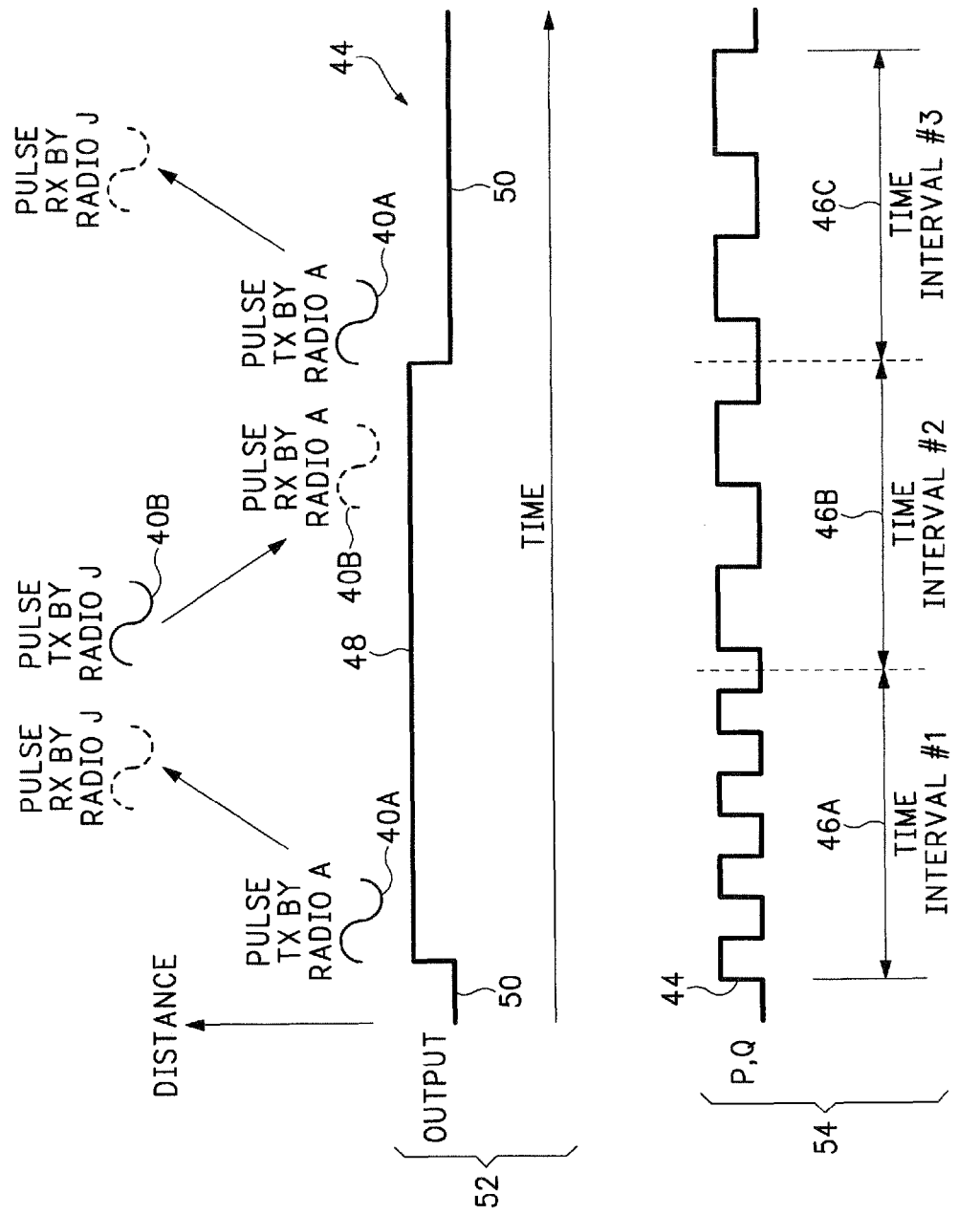

Referring to FIGS. 2 and 3, radio A retransmits a pulse 40A every time a pulse is received back from radio J. Or in other words, radio A transmits the pulses 40A at a Pulse Repetition Frequency (PRF) having a frequency which is a function of an amount of time required for the pulses to return back from the HID. Radio A or a processor in the base station 12 generates an output signal 44 by inverting a logic state each time another pulse 40A is transmitted. The frequency of the output signal 44 is therefore half the PRF. Since the time of travel for pulses 40A and 40B is a function of the distance between radios A and J (plus a constant), the frequency of the output signal 44 is a function of the distance between radios A and J.

Radio A continues to transmit pulses at a Pulse Repetition Frequency (PRF) that is a function of to the time of travel of the radio waves between the two devices 12 and 26, plus a constant delay corresponding to the time required by the base station 12 and the pointing device 26 to receive and retransmit the pulses 40. A similar output signal 44 is generated for the pulses 42A and 42B in FIG. 2 ping-ponged back and forth between radio B and radio K.

The pointing device 26, such as a mouse, is an incremental device in which changes in position, rather than absolute position, is the quantity being measured. Also, the direction of movement is measured relative to the current position of the pointing device, rather than relative to the base station 12, the computer 20 (FIG. 1) connected to the base station 12, or any other fixed point. Therefore, incremental movements of pointing device 26 may be detected by measuring changes in the frequencies of the output signals 44, and the accuracy of the measurements are unaffected by time delays that may differ as a result of manufacturing variations, such as the processing time required to receive and retransmit pulses 40 and 42.

The frequency of output signal 44 is a function of the distance between radios A and J. The total delay time for the pulses 40A and 40B can include the sum of the response time of radio A (the time between the start of transmission of the pulse 40A and the start of reception of the transmitted pulse 40B), the response time of radio J, and the time taken for the pulses 40A and 40B to travel between the antennas 18A and 30A. These constants will be features of the radio implementation, and so the distance A-J ($D_{aj}$) can be accurately calculated for any given system according to the frequencies of output signal 44.

Similarly, the second output signal 44 generated for the pulses 42A and 42B transmitted between radios B and K has a frequency which is a function of the distance B-K ($D_{bk}$) between antenna 18B and antenna 30B.

Referring specifically to timing diagram 52 in FIG. 3, pulses 40A and 40B are sent back and forth between radio A and radio J. However, this is only one example and there may be a train of pulses that are sent back and forth between the radios, such as shown in FIG. 2. Radio subsystem 14 (FIG. 2) changes the logic state of the output signal 44 whenever another pulse signal 40A is sent to radio J. The output signal 44 changes to a high logic state 48 when it initially sends out pulse 40A and remains in the high logic state 48 until it receives pulse 40B back from radio J. The radio subsystem 14 upon receiving returned pulse 40B changes the output signal 44 to a low logic state 50 when a next pulse 40A is sent to radio J. The output signal 44 changes from the low logic state 50 to another logic high state when the pulse 40B is received back from radio J and the next pulse 40A is transmitted. This process is continuously repeated over successive timing intervals.

Timing diagram 54 shows several timing intervals 46 for the output signal 44. During a first timing interval 46A, the logic state for the output signal 44 changes eight times. This represents radio A sending pulse 40A and receiving back pulse 40B eight times during the time interval 46A. In the time intervals 46B and 46C the logic state for the output signal 44 changes four times. This represents radio A sending pulse 40A and receiving back the pulse 40B four times during the time interval 46A.

The eight logic state changes in time interval 46A is associated with a particular distance between antenna 18A in radio A and antenna 30A in radio J. The lower number of four logic states in time interval 46B indicates antenna 30A has moved a farther distance from antenna 18A. The same four logic states in time interval 46C indicates that antenna 30A has remained at substantially the same distance from antenna 18A during both time interval 46B and 46C.

Movements of the pointing device 26 are inferred according to the number of logic state changes, or changes in frequency, of the output signal 44 relative to each successive time interval 46. If the frequency of output signal 44 increases for a particular time interval 46, then the associated antenna in the pointing device 26 has moved closer to the associated antenna in the base station 12. If the frequency of output signal 44 decreases for a particular time interval 46, then the associated antenna in the pointing device 26 has moved farther away from the associated antenna in the base station 12. Thus, the change in frequency of the output signal 44 is a function of the change in distance between the antennas 18 and 30 in the base station 12 and pointing device 26, respectively.

Figure 4:
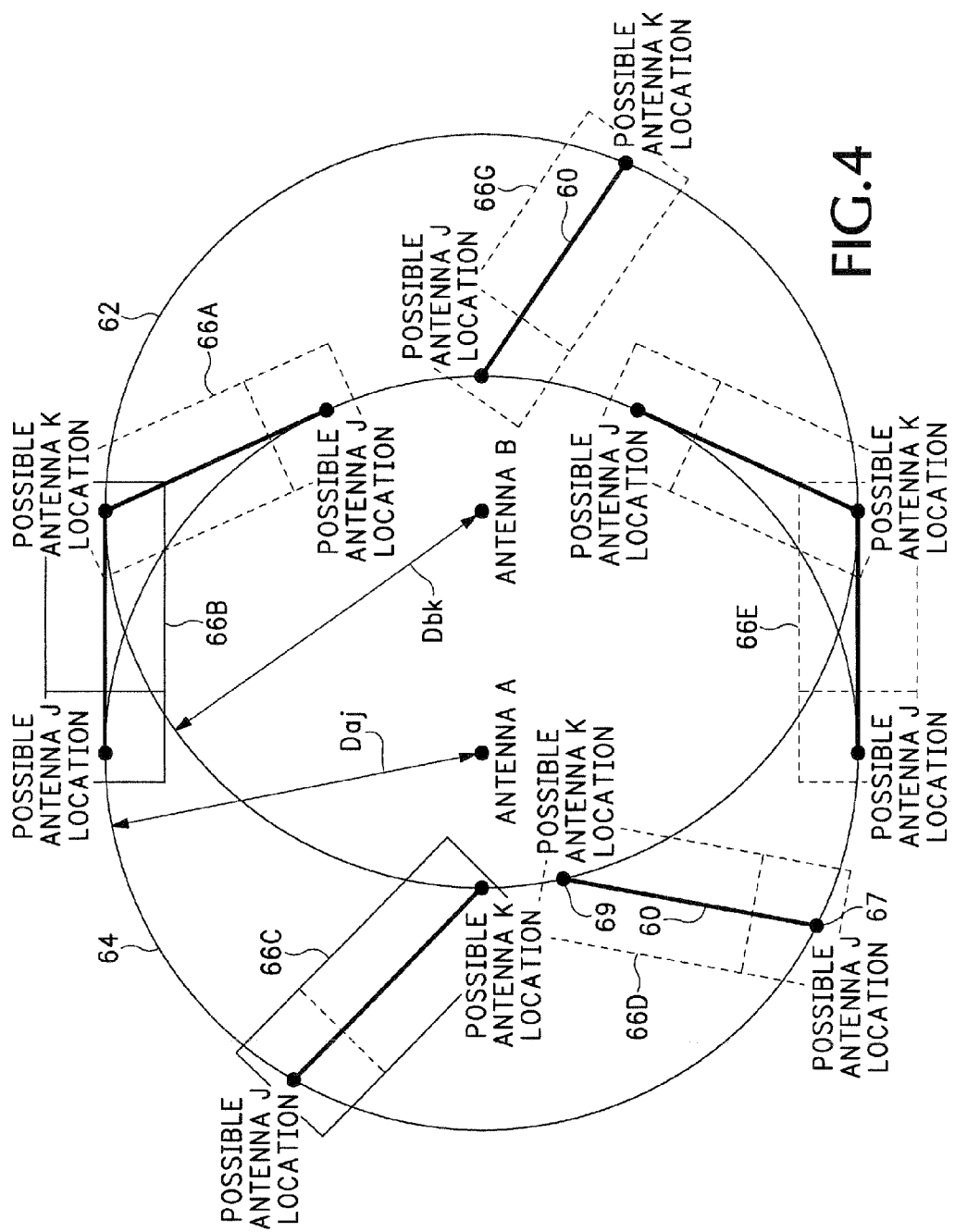
FIG. 4 shows the range of mouse locations which may be inferred using a single pair of distance measurements.

FIG. 4 shows how the positions of the pointing device 26 are identified using a pair of antennas in the base station 12 and a pair of antennas in the pointing device 26. The points J, such as at location 67 refer to possible locations of the J antenna derived from the frequency of the first output signal 44 associated with the pulse transmission 40 in FIG. 2. Similarly, points K, such as at location 69, refer to the possible locations of the antenna K derived from the frequency of a second output signal 44 associated with the pulse transmission 42 in FIG. 2. The dark lines 60 refer to a fixed known distance Djk between the two antennas 30A and 30B on the pointing device 26 as shown by distance D in FIG. 1.

From the detected frequencies of the two output signals 44 derived from pulse signals 40 and 42, it is possible to infer that the pointing device 26 is located/orientated on a locus for which the line 60 of length Djk links the circumferences of two circles 62 and 64 of radii Daj and Dbk. The radius Daj is the calculated distance between radio A and radio J and the radius Dbk is the calculated distance between radio B and radio K.

Figure 5:
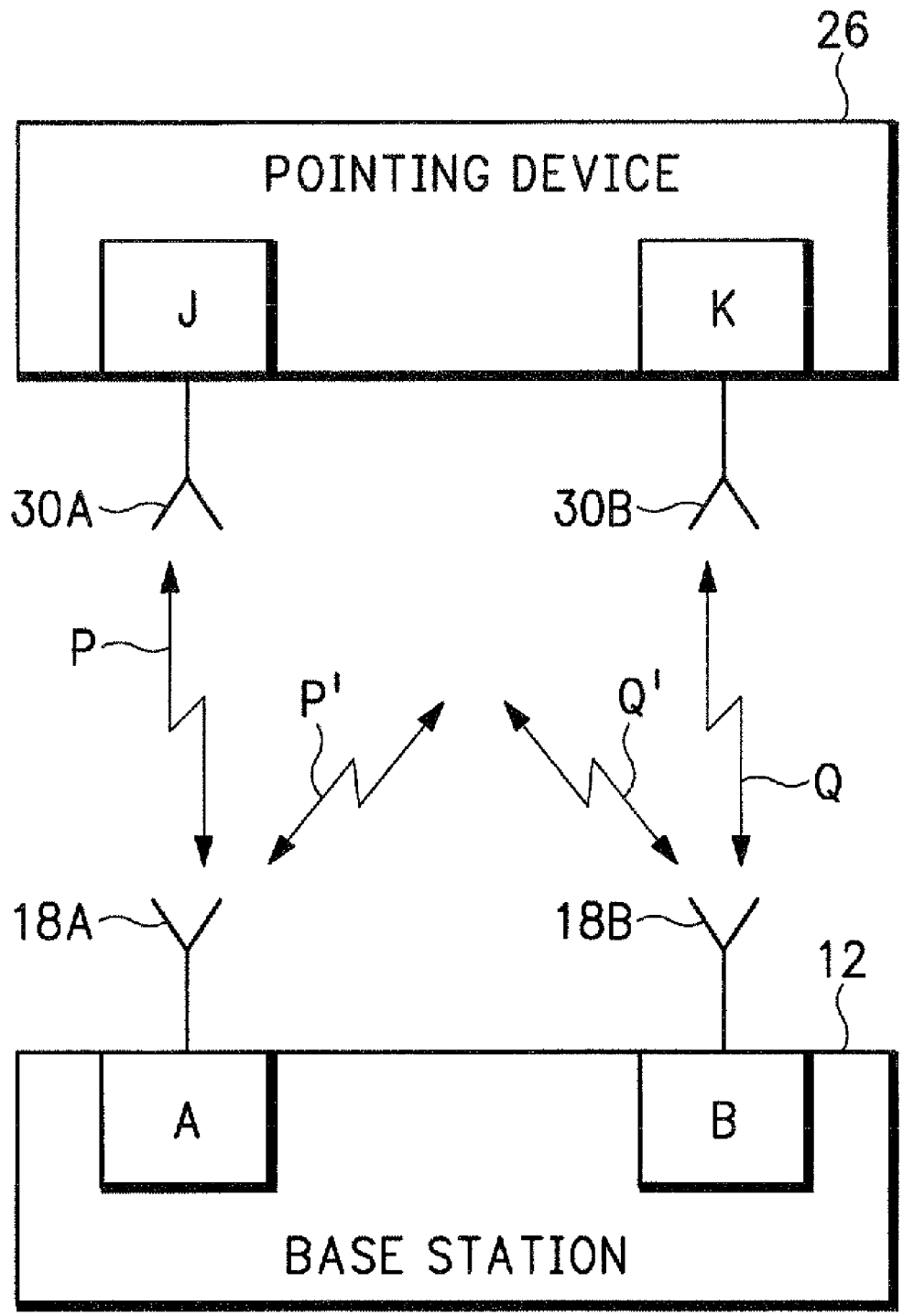
FIG. 5 shows how the ping-pong communication can be performed between each of the antennas in the base station and each of the antennas in the pointing device.

As shown in FIG. 4, simply sending two signals to two different antennas and measuring the frequency of the returned pulse(s) only identifies the two circles 62 and 64. This still leaves a large number of possible positions 66A-66G for the pointing device 26. Referring to FIG. 5, one way to isolate the pointing device position is to also determine the distance between the antennas for radios A and K (Dak) and the distance between the antennas for radios B and J (Dbj). This is done by having radio B transmit a second pulse or second set of pulses at the frequency responded to by radio J and for radio A to transmit a second pulse or second set of pulses at the frequency responded to by radio K. This allows the base station 12 to calculated four separate circles, or circle radius' as shown in FIG. 6.

In order to determine all four distances Daj, Dak, Dbj and Dbk, for a known, fixed period, radios A and B transmit to radios J and K respectively, generating PRFs P and Q. Radios A and B then swap radio frequencies and transmit to radios K and J, respectively, for a known fixed period, generating PRFs P' and Q'. The values Daj and Dbk are calculated from P and Q, respectively, and the values Dak and Dbj are calculated from P' and Q', respectively. In other words, the frequency of the pulses received from signals P, Q, P' and Q' are used to identify the distances Daj, Dbk, Dak and Dbj. As described above in FIG. 3, the distances Daj, Dbk, Dak and Dbj are calculated according to the frequency of the output signals 44 associated with each of the signals P, Q, P' and Q'.

Figure 6:
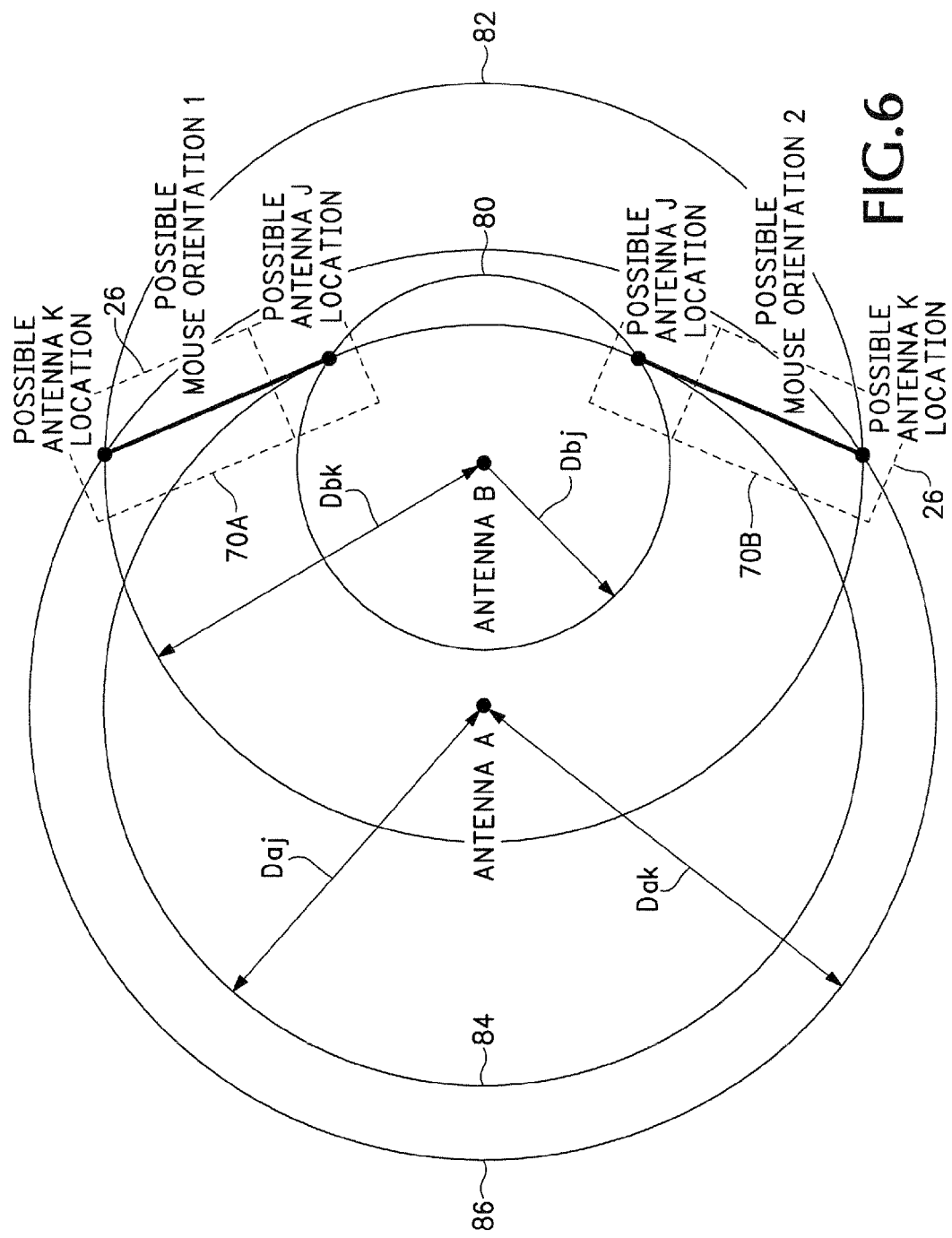
FIG. 6 shows how two mouse locations may be inferred from two pairs of distance measurements.

FIG. 6 shows that there are only two possible positions 70A and 70B for the pointing device 26 when distances Daj, Dbk, Dak, and Dbj are calculated. The two positions 70A and 70B include the position of the antenna for radio K at the intersection of circles Dak and Dbk and the position of the antenna for radio J at the intersection of circles Daj and Dbj. The first position 70A and second position 70B are typically widely separated. Thus, one of the two positions 70A and 70B can be inferred from additional detected changes in pointing device movement. In some applications other factors are used to infer which of these locations is correct.

For example, an initialization operation may be used to determine the initial orientation of the pointing device 26. During normal operation it typically will not be necessary to make this additional measurement, since only changes in mouse position and orientation need to be detected. However, it may be prudent to periodically reinitialize in order to insure that the calculated orientation is correct, for example during periods of mouse inactivity.

One possible technique for making this initial position/orientation determination is to add a third antenna A' to the base station 12 that communicates with radio A or B through an electronically controllable switch. The three antenna system is shown in more detail below in FIG. 7. The position of this third antenna A' relative to the other two base station antennas A and B is known. The radio subsystem 14 (FIG. 1) can then determine trigonometrically which of the two possible position/orientations 70A or 70B is actually occupied by the pointing device 26. Once the base station 12 has computed the initial position and orientation of the pointing device 26, the magnitude and direction of pointing device motion is calculated from the changes in frequency of the output signals 44 (FIG. 3) associated with signals P, P', Q and Q' (FIG. 5).

Figure 7:
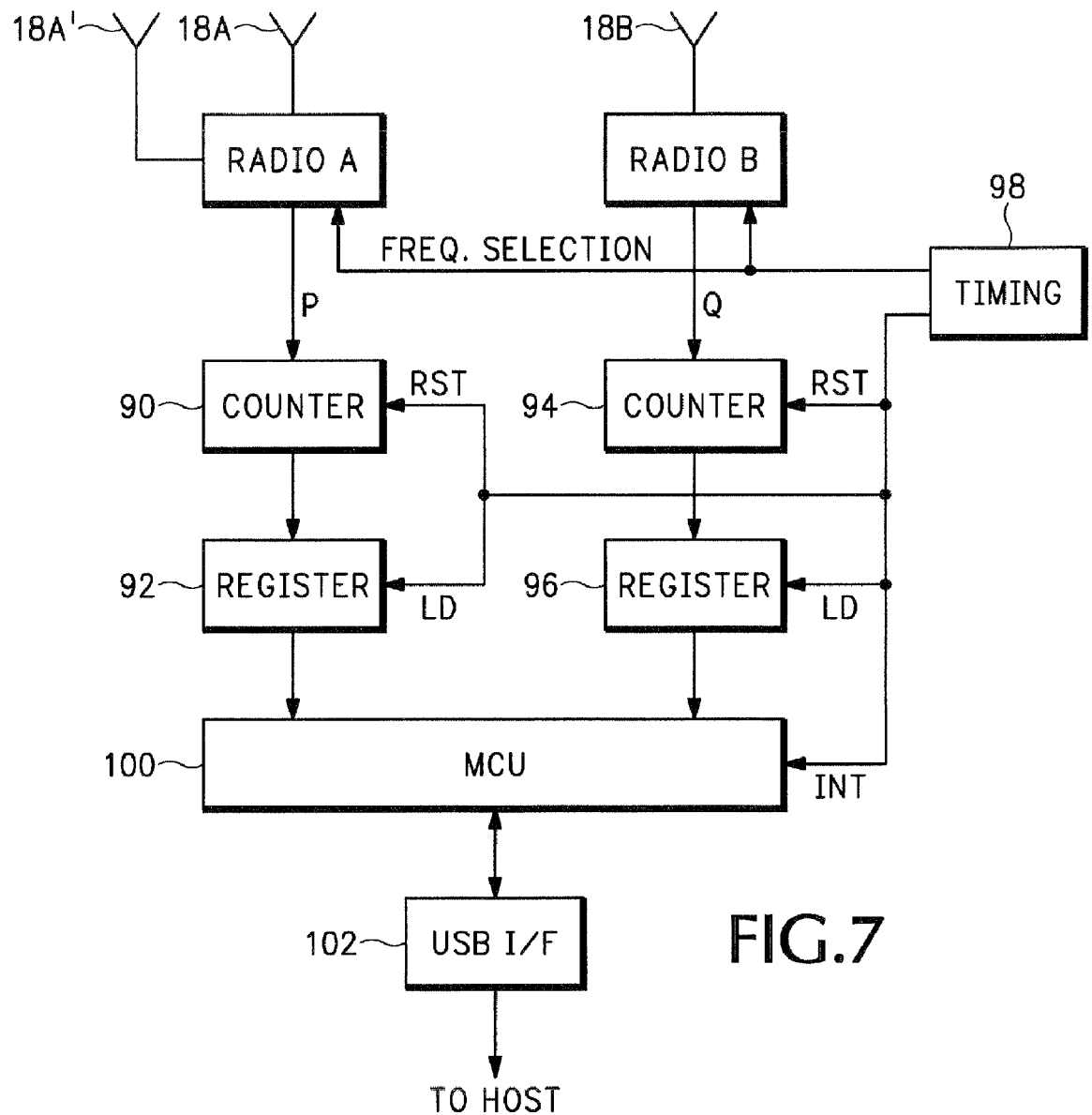
FIG. 7 is a circuit diagram for the base station.

FIG. 7 shows in more detail one example of circuitry used in the base station 12 for determining the location of the pointing device 26. The radios A and B are coupled to antennas 18A and 18B, respectively. A third antenna 18A' is coupled to radio A and is used for isolating an initial position of the pointing device 26 as described above. A timing circuit 98 is used for selecting when the pulses are transmitted at the different frequencies associated with signals P, P', Q and Q'.

For some period of time radio A will use a first frequency that is associated with radio J and radio B will use a second frequency that is associated with radio K. After that period of time, the timing circuit 98 notifies radio A to use the second frequency associated with radio K and notifies radio B to use the first frequency associated with radio J. The process then repeats with radio A communicating back with radio J and radio B communicating with radio K.

For example, the signals P and Q in FIG. 5 are transmitted by radios A and B, respectively, during a first time period. The signals P' and Q' are then transmitted by radios A and B, respectively, during a second time period. During a first time interval, the circuitry in radios A and B generate the output signals 44 that have frequencies that are a function of the time delays from signals P and Q and then during a next time interval generates output signals 44 that have frequencies is a function of the time delays from signals P' and Q'.

The number of logic changes or frequency of the output signals 44 generated by radios A and B are counted by counters 90 and 94, respectively, and the results stored in registers 92 and 96, respectively. The registers 92 and 96 are loaded with the count/frequency values from the counters 90 and 94 for each time interval 46 (FIG. 3) and the counters are then reset.

A Microcontroller Unit (MCU) 100 receives the count/frequency values for each time interval. The MCU 100 during a first time interval receives the count/frequency values associated with Daj and Dbk (FIG. 5) and during a second time period receives the count/frequency values associated with Dak and Dbj. From these two sets of count/frequency values, the MCU 100 determines the changes in position for the antenna locations J and K on the pointing device 26 as shown above in FIG. 6. The identified changes in movement of the pointing device 26 in one embodiment is then output from the MCU 100 through a USB interface 102 to a host computer 20 (FIG. 1). In another embodiment, some or all of the position calculations for the pointing device 26 are performed by the host computer 20. In this embodiment, the raw values from registers 92 and 96 may be sent to the host computer 20 via the MCU 100 for further processing.

During initialization, the MCU 100 can read a third set of count/frequency values generated by the third antenna 18A'. The third antenna 18A' may also be used periodically during wireless transmissions to verify which of the locations 70A or 70B in FIG. 6 is actually the location of the pointing device 26. If a three dimensional pointing device movement is implemented, then a third set of antennas are used and a third set of count/frequency values are periodically received by the MCU 100 during a third time interval to identify the elevation z position of the pointing device 26 in addition to the x and y positions.

The equations below describe in more detail the math that may be used in the MCU 100 for identifying the location of the pointing device 26. For example, consider point J on the pointing device 26 to be at $x=y=0$, and point K to be at $x=0$, $y=-Djk$. The circles 80 and 82 in FIG. 6 are centered on point J instead of point B and circles 84 and 86 in FIG. 6 are centered at point K instead of point A. Also, a circle of radius Dab is centered on point A or point B describing the possible orientation of the base station 12 relative to the pointing device 26. This references everything to the pointing device 26 since it is desired to identify pointing device motion relative to its own center line.

The locus of a circle is $X^2+Y^2=R^2$, where X and Y are the coordinates of the center point of the circle and R is the radius of the circle. Therefore the following equations are solved.

$$Xa^2+Ya^2=Daj^2 \qquad \text{Equations (1)}$$

$$Xb^2+Yb^2=Dbj^2 \qquad \text{Equations (2)}$$

$$Xa^2+(Ya+Djk)^2=Dak^2 \qquad \text{Equations (3)}$$

$$Xb^2+(Yb+Djk)^2=Dbk^2 \qquad \text{Equations (4)}$$

$$(Xa-Xb)^2+(Ya-Yb)^2=Dab^2 \qquad \text{Equations (5)}$$

Equations (6) and (7) are solutions of equations (1) -(5).

$$Ya^2=(Dak^2-Djk^2-Daj^2)/2Djk \qquad \text{Equations (6)}$$

$$Yb^2=(Dbk^2-Djk^2-Dbj^2)/2Djk \qquad \text{Equations (7)}$$

Equation (6) solves equations (1) and (3) for Ya and equation 7 solves equations (2) and (4) for Yb. Xa can then be found by solving equations (1) and (6) and Xb can be found by solving equations (2) and (7). There may be two solutions for each of Xa, Xb, Ya, Yb because of the squaring function. However, substituting in equation (5) resolves the equations into one set of values for Xa, Xb, Ya, Yb.

There may be some errors in determining Xa, Xb, Ya, Yb since the turn-around time and other constants that contribute to the PRF in addition to the distance are not precisely known. However, any error can be corrected by taking continuous readings of Xa, Xb, Ya, Yb. For example, two readings, Xa and Xa' can be taken to derive dXa=Xa-Xa' so that the imprecision in the Xa and Xa' readings cancel out.

As well as position, a pointing device typically reports the state of buttons, scroll wheels, and other features which are typically found in computer mice. This button state information can be transmitted to the base station 12 from the pointing device 26 using the same radios A, B, J, and K. In one implementation, this is achieved either by providing a short period between the Daj/Dbk-Dak/Dbj measurement switching where the pointing device 26 transmits button state data. In another implementation the pointing device 26 modulates the pulses 40 and 42 (FIG. 2) during normal operation, for example, by inverting some of the pulses between reception and retransmission. The combination of non-inverted and inverted pulses provide digital information representing the button, wheel and other state data generated by the pointing device 26.

In many cases, a single wireless base station 12 is used to communicate with multiple human interfaced devices (HIDs), for example, both a mouse and a keyboard. In one implementation, the base station 12 receives and/or transmits other data to/from other wireless devices, such as keyboard data. These transmissions can be interleaved with the mouse location signaling, in a similar manner as described above for sending pointing device state data.

An example is described to demonstrate the performance that may be achieved using the improved device and apparatus. In this example a computer mouse is 0.5 meters (m) from the base station 12, and the round-trip time of travel for the pulses in signals P and Q in FIG. 5 is approximately 3.3 nanoseconds (ns). If the radios A, B, J and K are all designed to operate at 2.4 Gigahertz (Ghz), the period of a single cycle pulse is approximately 0.41 ns. It is therefore practical to build radios A, B, J, K so that the total response time does not significantly exceed the round trip time of travel of the pulse signals.

In a further example, using the distance of 0.5 m, a total constant response time of 3.3 ns is assumed. In this case, the PRF is approximately 150 Megahertz (MHz). The output signal 44 in FIG. 3 toggles for each pulse repetition making for an output frequency of 75 MHz. Mice typically report changes in position approximately every 10 ms, therefore P and P' in FIG. 5 would each be counted for approximately 5 ms. Thus in the implementation described above, where frequency change is measured by digital counting, 375000 cycles of the output signal for each of P and P' signals is counted in a 10 ms sampling interval. It is possible to count the number of cycles with a resolution of half a cycle. Therefore, a change in output frequency at P or Q of 1.5 parts per million (ppm) could be detected. As half of the frequency of signals P or Q is attributable to the time of travel, a 3 ppm change in round-trip time is detectable. As the round-trip time is double the distance between the mouse and base station, a 6 ppm change in mouse position is detectable.

Therefore, in the case where the mouse is 0.5 m from the base station 12, and assuming no measurement errors, mouse motion of 3 microns (um) can be detected. This compares with the 31 um resolution of a conventional 800 dpi optical mouse sensor. Thus the radio operated pointing device provides significantly greater resolution than conventional wireless pointing device technology.

For shorter or longer distances between the pointing device 26 and the base station 12, and for different response times in the radios A, B, J and K, the resolution will vary. Additionally, sources of error such as frequency jitter may inject noise into the pointing device measurement. However, the resolution of the radio system described above is more than an order of magnitude better than the conventional optical mouse sensors. Therefore, any loss in accuracy due to noise effects still provides a substantial improvement over present wireless systems.

In an alternative embodiment, the base station antennas 18A and 18B may be mounted in a desk-mounted "dongle" or external attachment. A small difference may exist between the plane of the base station antennas 18A and 18B and the plane of movement of the pointing device 26. For example if the base station 12 is incorporated into a laptop computer, slightly above the plane of motion of the pointing device 26, or incorporated in a keyboard that is slightly tilted with respect to the plane of motion of the pointing device 26. This non-planar relationship typically does not significantly affect performance of the pointing device 26.

However, in some cases, it may be desirable for the base station 12 to be located well off the plane of motion, for example in a desktop PC enclosure. In this case it may be necessary to add further antennas and possibly additional radios. Provided that motion of the pointing device 24 remains in one plane, this topology can be accommodated by the use of two antennas for each radio in the base station 12, while retaining just one antenna for each radio in the pointing device 24.

One possible method of detecting mouse movement in this case would be for each base station radio to have two pulse repetition frequency (PRF) outputs, each corresponding to one of its two antennas. Each base station radio would spend alternating periods of time using each of its two antennas, and sending its PRF output to the corresponding antenna. Rather than using two different frequencies for communication with radios J and K, pulses of the same frequency, but opposite phase could be used.

In an alternative implementation, rather than being fixed, the frequencies of the signals P, P', Q and Q' could change or "hop" with each transmission in order to improve resistance to interference and/or comply with regulatory requirements. In another implementation, a single radio in each of the pointing device 24 and the base station 12 can be switched between multiple antennas. The radios cycle between antennas in order to sequentially determine the distances between each antenna in the base station 12 and each antenna in the pointing device 24. In one implementation of this variant, a single frequency/phase of pulses is used. The base station 12 periodically sends commands to the pointing device 24 to switch antennas. During this synchronization process the pointing device 26 sends information about the state of buttons, scroll wheel, etc. In one embodiment, the sync commands comprise start of frame (SOF) and end of frame (EOF) markers with the phase inverted with respect to the pulses that are used to make the pointing device distance measurements.

In many cases, the base station 12 used by a wireless mouse and keyboard is desired to be as small as possible. However, the requirement for multiple antennas may limit the size of the base station 12. Therefore in an alternative implementation, the base station 12 for the pointing device 24 is located within a keyboard 21 (FIG. 1) or within the host computer 20, which have large fixed form factors. In one implementation the keyboard 21 is a "wired" keyboard, which communicates mouse motion to a PC over a Universal Serial Bus (USB) connection. In another implementation, the keyboard 21 is wireless, and wirelessly communicates both mouse and keyboard data to the base station 12 attached to the PC.

In another variation, the mouse 26 and keyboard 21 ping-pong pulses back and forth, but the keyboard does not count the pulses, or calculate mouse location. The pulse counting and location calculations are performed by the PC base station that "listens" for the pulses using a single antenna and also receives mouse and keyboard button data interleaved with bursts of "ping-ponging" pulses.

The exemplary implementation proposed is just one of the many methods of measuring time of travel of an electromagnetic signal. However, any other method can be used for detecting the motion of a computer pointing device using time of travel between the pointing device and a base station. The method and apparatus can also be extended to other wireless PC peripherals, including detecting handle motion in joysticks, detecting "tilt" in game pads, or detecting rotational motion in steering wheels.

A third antenna can be added in both the base station and the pointing device to create a 3-Dimensional mouse or game controller, that senses pointer motion in three dimensions. This can also be used in applications such as computer gaming and virtual reality systems. The improved method and apparatus can also be used to detect movement of pen-like computer input devices. Another embodiment measures the position/motion of a mouse by detecting changes in the frequency of a continuously transmitted RF signal resulting from the Doppler effect.

The wireless system described above enables the development of mice with significantly longer battery life, because the illumination LED and power-hungry optical sensor can be removed from the pointing device. In addition, cost of high quality computer mice is reduced by removing the cost of the optical sensor. The cost of the radio subsystems in the mouse and base station is likely to be similar to that of radios in existing 2.4 Ghz wireless optical mice. Constraints on pointing device form factors imposed by the strict mechanical alignment required by optical mouse sensors are also eliminated while the also being able to identify pointing device motion more accurately than conventional optical mice.

From the perspective of user's productivity, usage studies have found that mouse users can more accurately control a cursor on a computer screen when the point at which motion is detected is as far forward in the mouse as possible (i.e., furthest from the wrist). By determining the location of point J (FIG. 6) and the angle of the line JK, it is possible it identify any point along the line JK. Thus, even a point further from K than J can be used as a "virtual sensor location".

Figure 8:
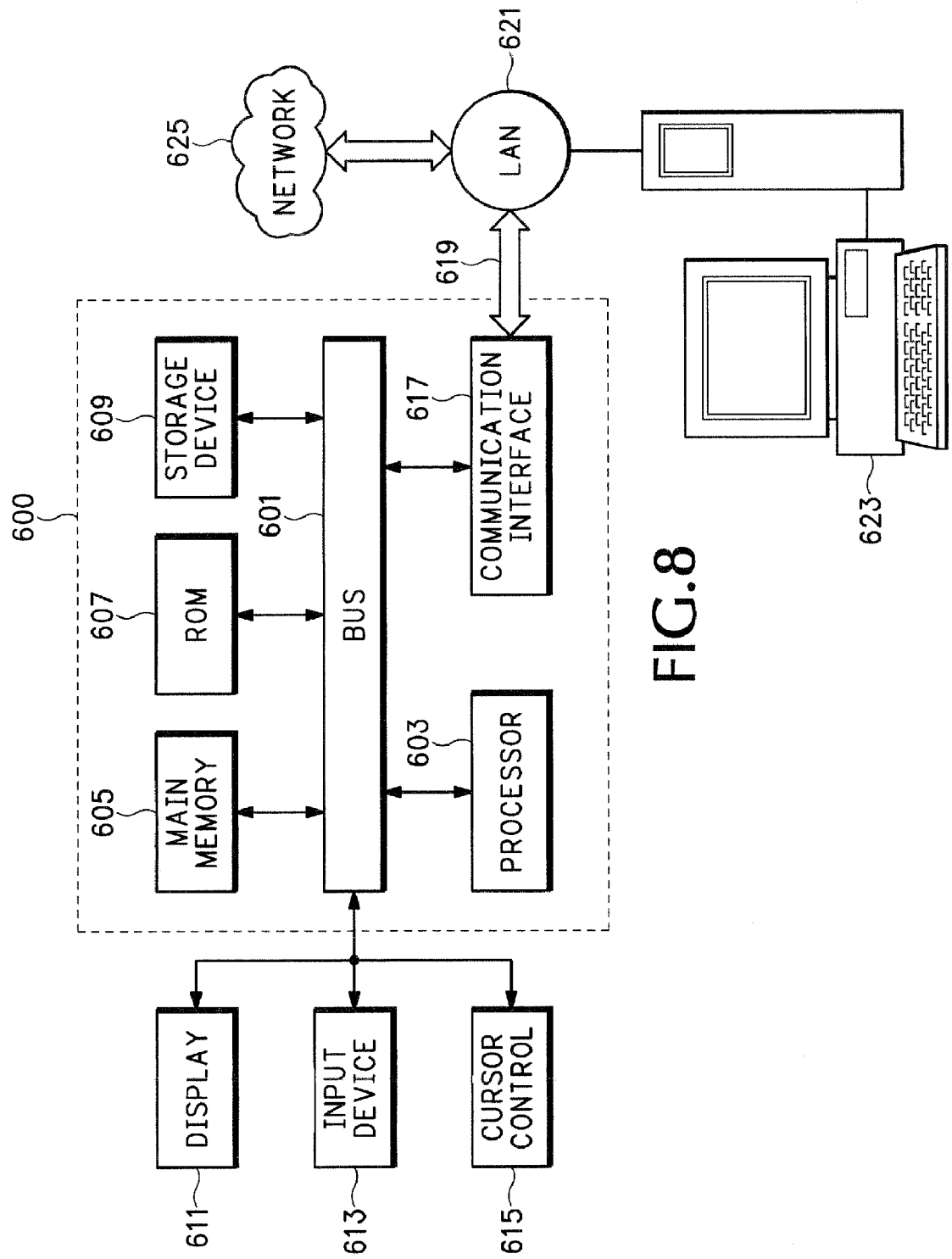
FIG. 8 shows an exemplary host computer that can be coupled to the base station.

One embodiment of the host 20 shown in FIG. 1 is shown in further detail in FIG. 8. The host computer 20 is shown as a computer system 600 upon which an embodiment according to the present invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, the improved apparatus and method may be used with or implemented as part of the computer system 600, and the overall system may operate in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider.

The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 605 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claims are made to all modifications and variations coming within the spirit and scope of the following claims.

What is claimed is:

1. A device for sensing the movement of a human interface device HID, comprising:
    two or more base station transceivers that each transmit radio signals at different selected frequencies to the HID to trigger retransmission of responsive radio signals back from a corresponding pair of transceivers disposed in the HID, wherein the pair of transceivers disposed in the HID are each coupled to a respective antenna, the HID antennae being mounted at fixed locations spaced apart on the HID;
    each base station transceiver configured to transmit a corresponding first radio signal at a respective one of the selected frequencies for reception and retransmission by the corresponding HID transceiver;
    each base station transceiver further configured to receive and detect the corresponding retransmitted radio signal back from the corresponding HID transceiver; and
    processing means coupled to each of the base station transceivers for generating a respective output signal that changes logical state responsive to the received retransmitted radio signals received from the corresponding HID transceiver, so that the output signal of a first one of the base station transceivers exhibits a first frequency proportional to a distance between the first base station and a first corresponding HID transceiver; and the output signal of a second one of the base station transceivers exhibits a second frequency proportional to a distance between the second base station and a second corresponding HID transceiver; and
    second processing means for calculating movement of the HID based on the first and second output signals.

2. The device according to claim 1 including a third antenna transmitting and receiving a third set of signals back from the HID for identifying an initial HID location.

3. The device according to claim 1 wherein the radio signals comprise a series of pulses and data indicating a state of buttons or scroll wheels on the HID is modulated onto the pulses or interleaved between the pulses.

4. The device according to claim 1 where the base station transceivers communicates with other wireless devices by interleaving communications for the other wireless devices between the radio signals for the HID.

5. The device according to claim 1 wherein base station transceivers are located in a keyboard connected by a cable or wirelessly to a host computer.

6. The device according to claim 1 including the base station transceivers and a Universal Serial Bus (USB) interface for sending movement information for the HID to a host computer.

7. A computer peripheral, comprising:
    a radio system identifying its position to a computing device by sending radio signals to the computing device having a propagation delay which is a function of a distance between the computer peripheral and the computing device;
    wherein the radio system receives and returns logic signals back to the computing device, the time for the logic signals to return back to the computing device being used to generate an output signal having a frequency that is a function of a distance of the computer peripheral from the computing device; and
    at least two antennae fixed in positions relative to one another that are spaced apart on the computer peripheral for receiving and sending back different radio signals to the computing device to indicate changes in position for the different locations of the two antenna on the computer peripheral.

8. A computer peripheral, comprising:
    a radio system identifying its position to a computing device by sending radio signals to the computing device having a propagation delay which is a function of a distance between the computer peripheral and the computing device; and
    at least two antennae fixed in positions relative to one another that are spaced apart on the computer peripheral for receiving and sending back different radio signals to the computing device to indicate changes in position for the different locations of the two antenna on the computer peripheral;
    wherein the radio system receives and returns logic signals back to the computing device, the time required for the logic signals to return back to the computing device used for generating an output signal having a frequency that is a function of a distance of the computer peripheral from the computing device.

9. The computer peripheral according to claim 8 wherein the radio system includes two radios receiving and returning pulses for different radio signal frequencies.

10. The computer peripheral according to claim 9 where the radio system acquires mouse state data and modulates the mouse state data onto the pulses or interleaves the data between the pulses used for identifying the position of the computer peripheral.

11. A method for identifying a location of a computer peripheral, comprising:
    identifying time periods required for at least two radio signals of different carrier frequencies to travel between the computer peripheral and a computing device;
    wherein said identifying time periods includes sending pulses from the computing device to the computer peripheral and identifying time periods for the pulses to return from the computer peripheral;
    generating an output signal that changes state based on the identified time periods;
    detecting changes in the frequency of the output signal; and
    using the detected changes in the frequency of the output signal to determine changes in position of the computer peripheral wherein said changes in position of the computer peripheral include changes in the respective positions of at least two different locations spaced apart by a fixed distance on the computer peripheral.

12. A method for identifying a location of a computer peripheral, comprising:
    sending pulses to the computer peripheral;
    repeatedly sending additional pulses each time the previously sent pulses are received back from the computer peripheral;
    identifying time periods required for the pulses to return from the computer peripheral; and
    using the identified time periods to generate an output signal that changes logic state each time pulses are transmitted;
    detecting changes in the frequency of the output signal; and
    identifying changes in the position of the computer peripheral, wherein said changes in position of the computer peripheral include changes in the respective positions of at least two different locations spaced apart by a fixed distance on the computer peripheral, according to the detected frequency changes in the output signal.

13. The method according to claim 12 including receiving pulses back from multiple antenna in the computer peripheral and detecting changes in orientation in the computer peripheral according to changes in a rate that the pulses are received back from each of the multiple antenna.

14. The method according to claim 13 including:
sending a first pulse stream from a first local antenna to a first peripheral antenna;
sending a second pulse stream from a second local antenna to a second peripheral antenna;
sending a third pulse stream from the first local antenna to the second peripheral antenna;
sending a fourth pulse stream from the second local antenna to the first peripheral antenna; and
measuring changes in the rate that pulses are received back from each of the first, second, third and fourth pulse streams to determine changes in the position of the computer peripheral.

15. The method according to claim 12 wherein said identifying changes in the position of the computer peripheral includes identifying changes in the position of the computer peripheral in three dimensions, wherein said changes in the position of the computer peripheral in three dimensions include changes in the respective positions of at least three different locations spaced apart by a set of fixed distances on the computer peripheral.

16. The method according to claim 12 including communicating with at least one other peripheral device by interleaving communications for the at least one other peripheral device between the radio signal pulses to the computer peripheral.

17. The computer peripheral according to claim 7 including a third antenna configured to transmit and receive a unique frequency radio signal back from the computer peripheral and three-dimensional processing means configured to determine movement of the computer peripheral in three-dimensions.

18. The computer peripheral according to claim 7 wherein the computer peripheral is a device selected from the group consisting of: a mouse, a pointing device, a game controller, a pen-like computer input device, a joystick, a human-interface device, a device comprising a button, a device comprising a scroll wheel, a remote control device, a device comprising a handle, a game pad, and a steering wheel.

19. The method of claim 11 further comprising:
identifying an interval for a z-coordinate radio signal of a unique carrier frequency to travel from the computer peripheral;
using the identified interval to determine changes in a third-axis position of the computer peripheral wherein said changes in position of the computer peripheral include changes in the respective positions of three different radio transceivers spaced apart by a fixed distance on the computer peripheral.

20. The method of claim 11 further comprising:
acquiring the computer peripheral state data, wherein the computer peripheral state data includes a button state of the computer peripheral.

* * * * *